M. FOGDE AND L. P. SOUTHWICK.
APPARATUS FOR PREPARING AND APPLYING STAMPS OR LABELS.
APPLICATION FILED MAY 23, 1919.
1,435,459. Patented Nov. 14, 1922.
7 SHEETS—SHEET 2.
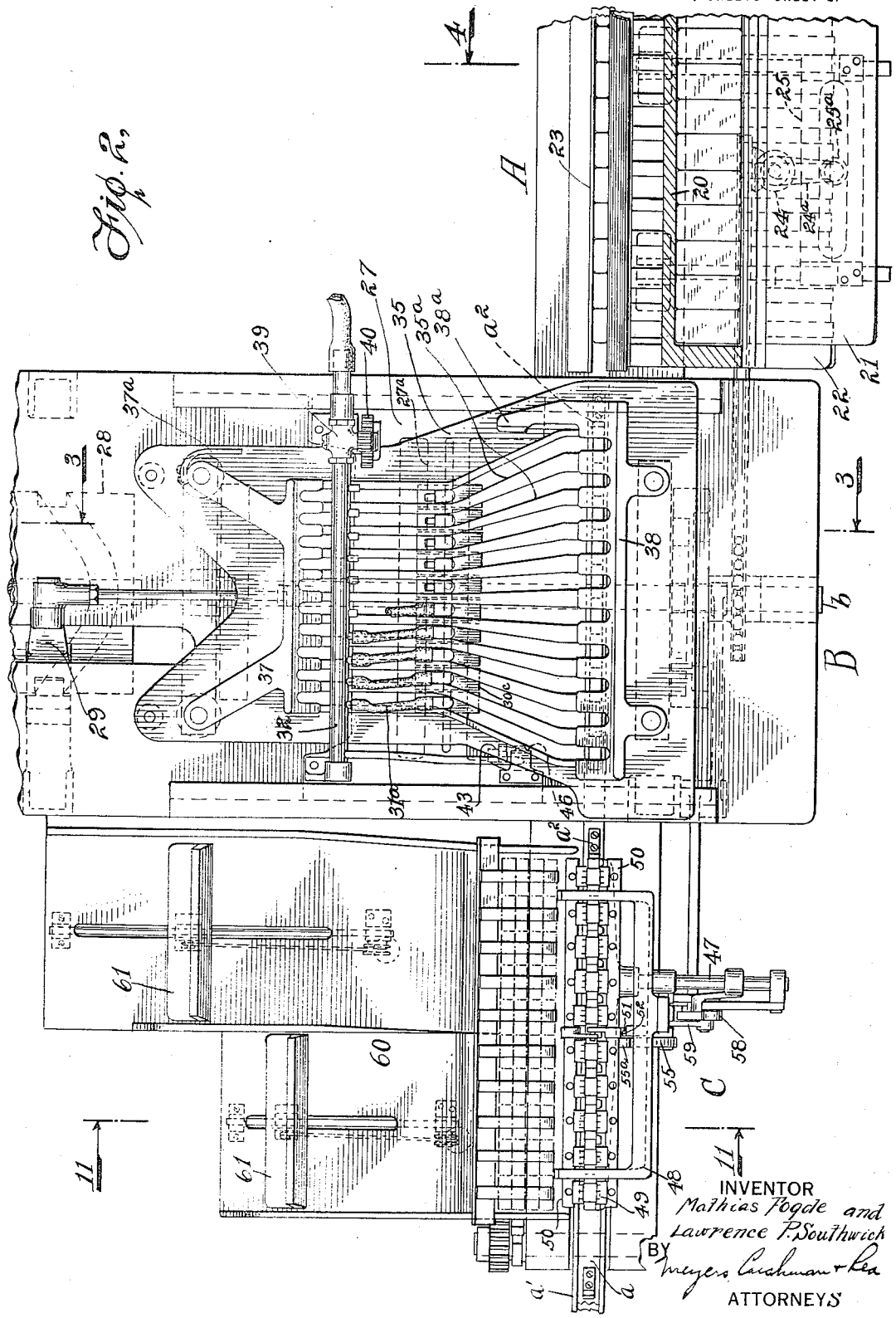

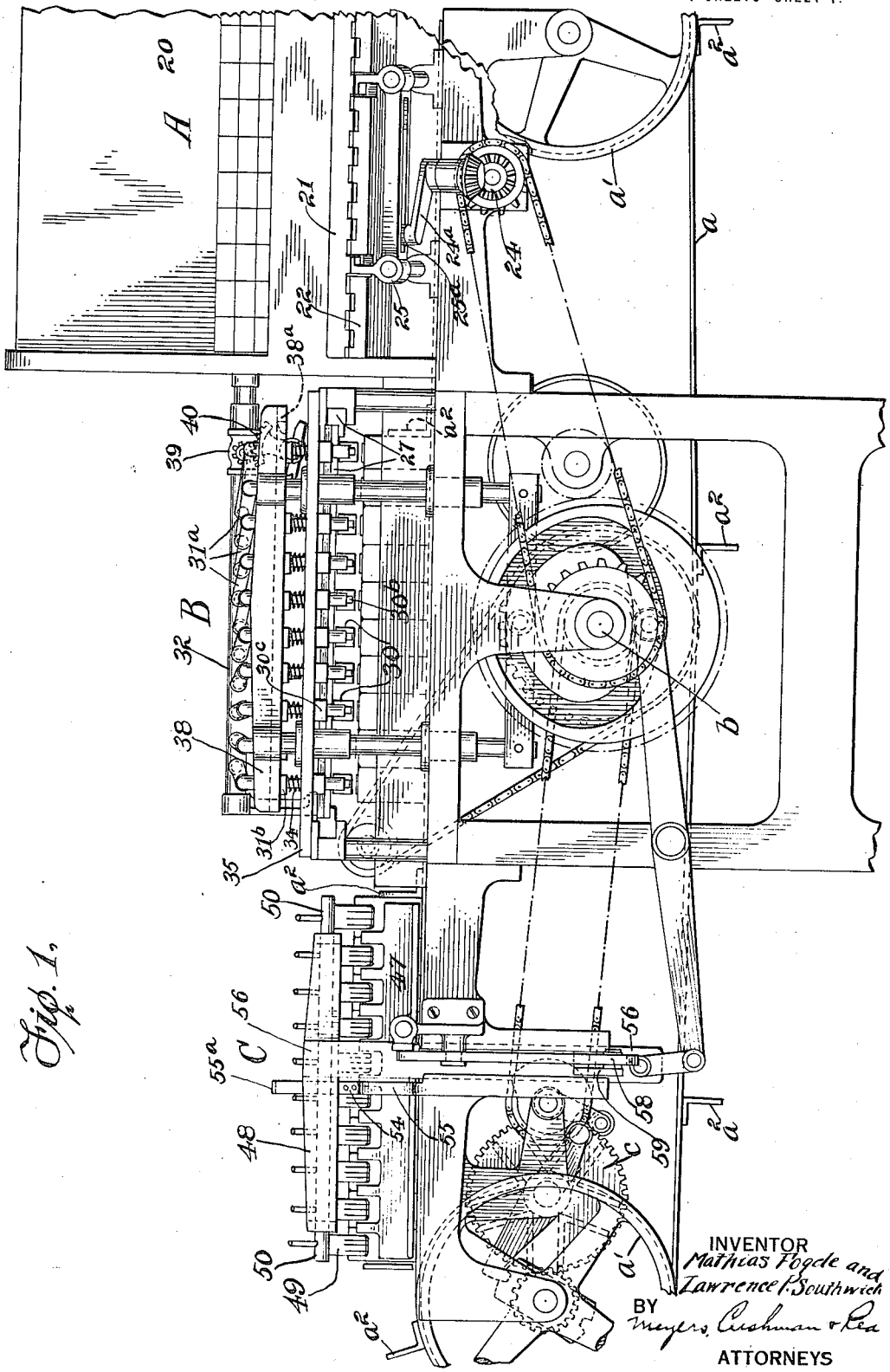

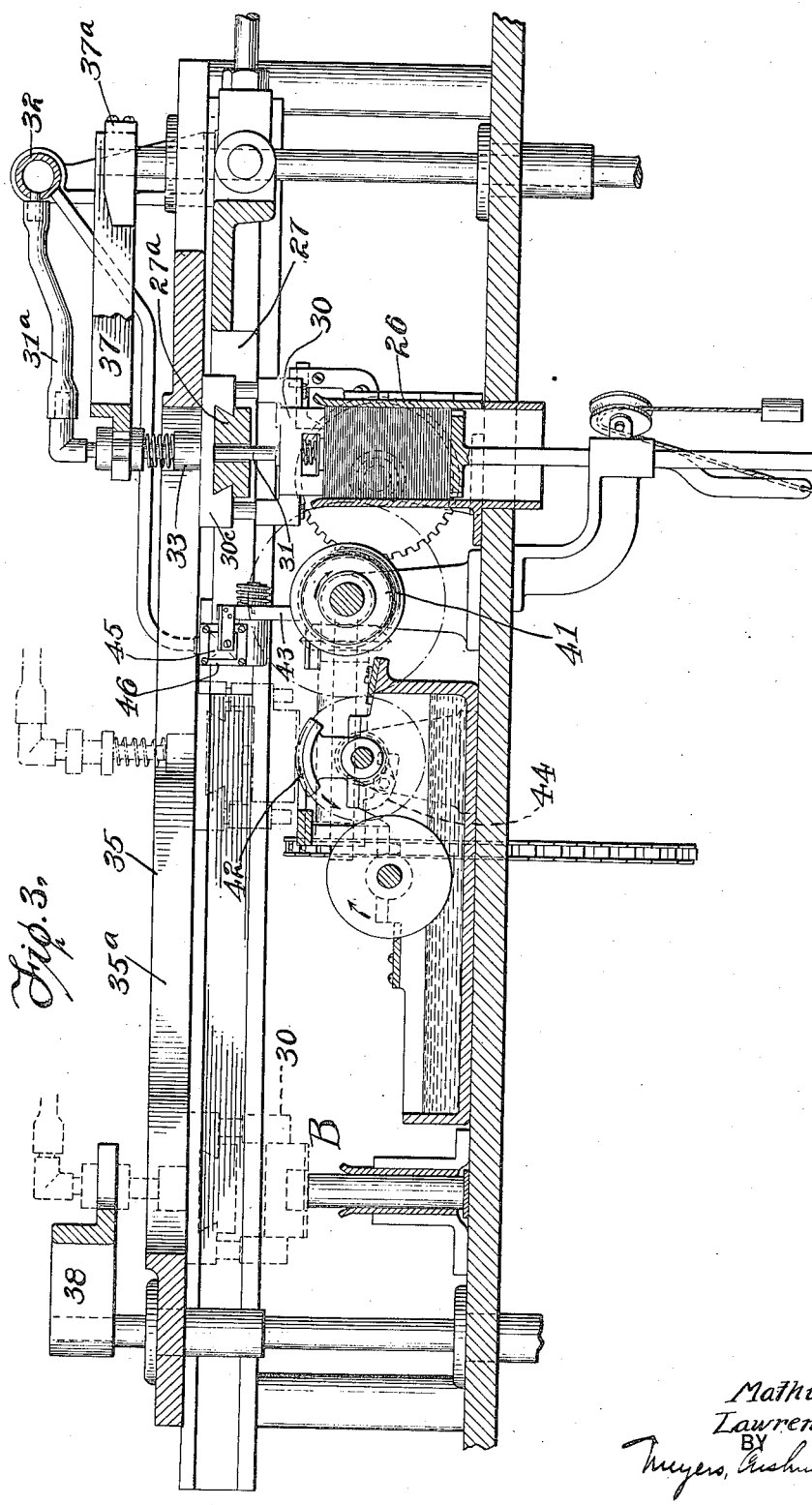

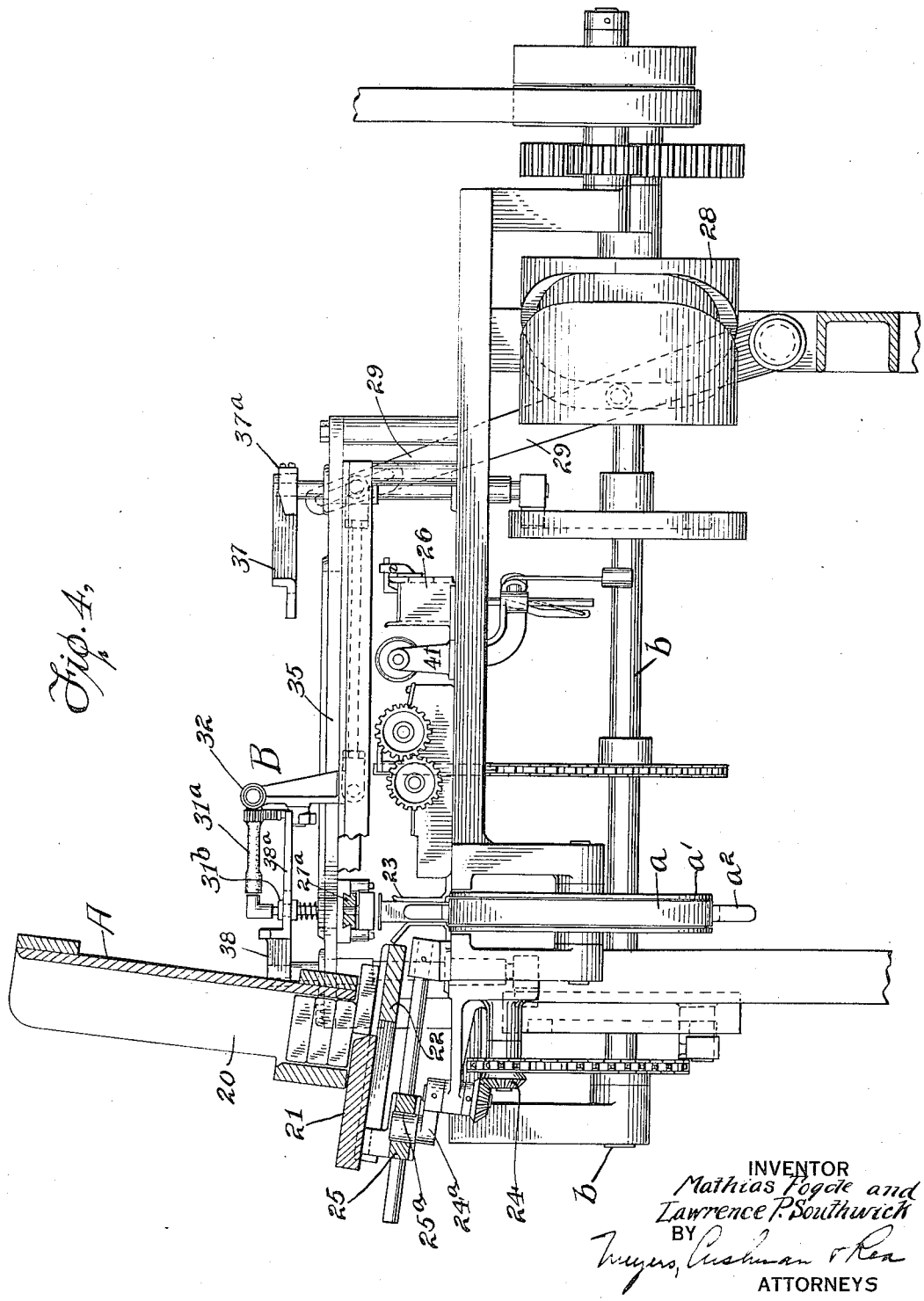

M. FOGDE AND L. P. SOUTHWICK.
APPARATUS FOR PREPARING AND APPLYING STAMPS OR LABELS.
APPLICATION FILED MAY 23, 1919.
1,435,459.
Patented Nov. 14, 1922.
7 SHEETS—SHEET 5.
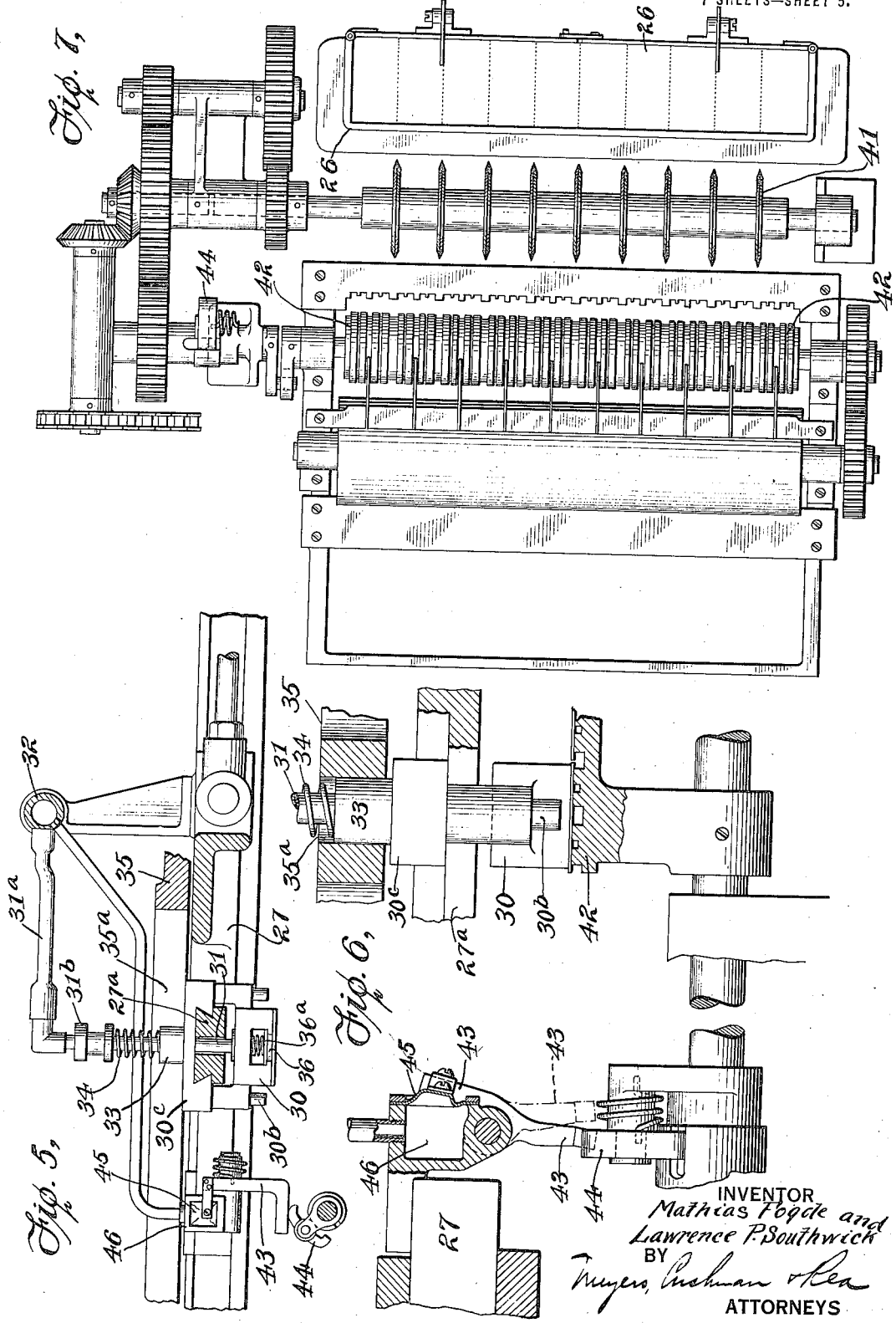
INVENTOR
Mathias Fogde and
Lawrence P. Southwick
BY
Myers, Cushman & Rea
ATTORNEYS

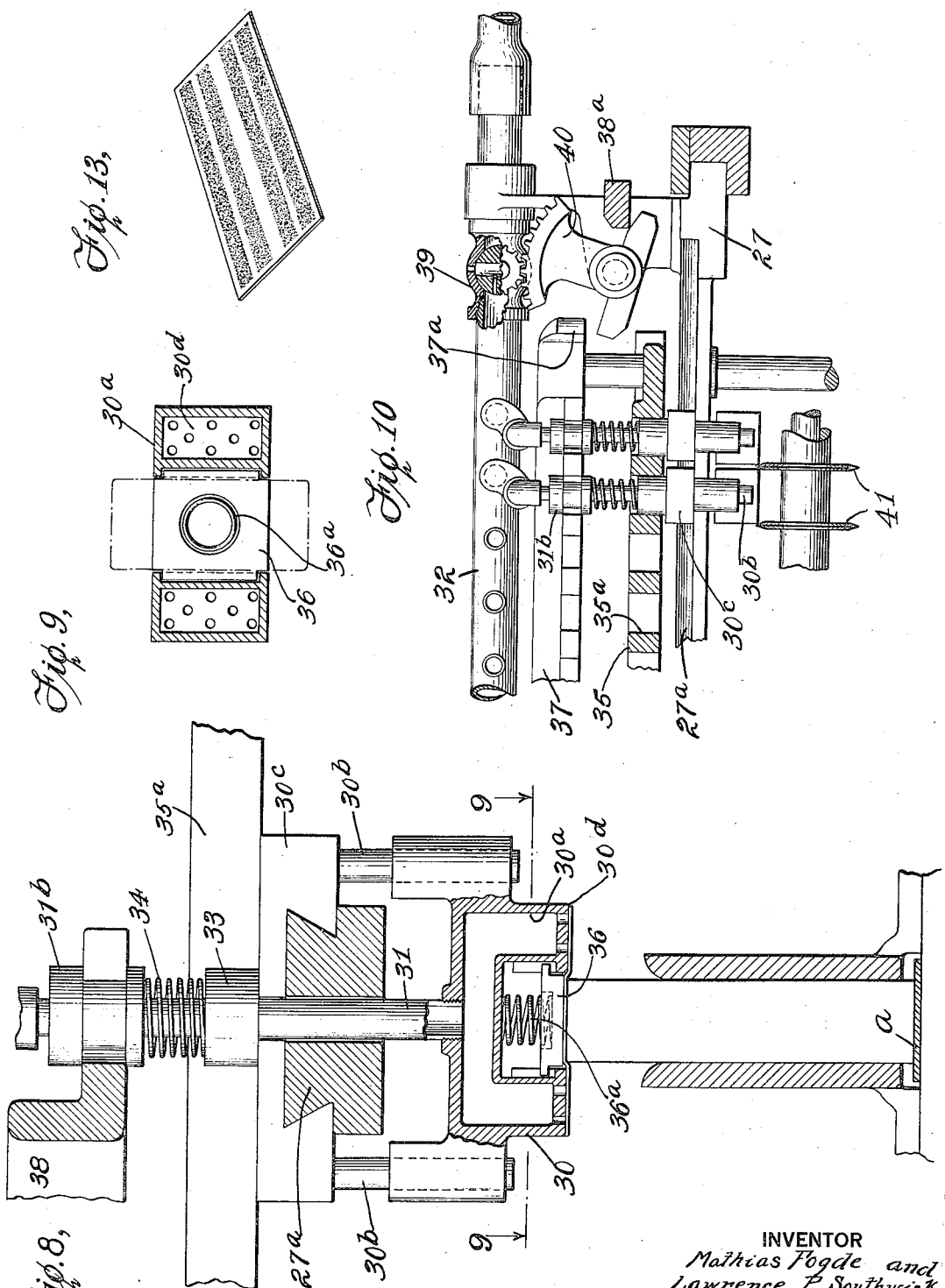

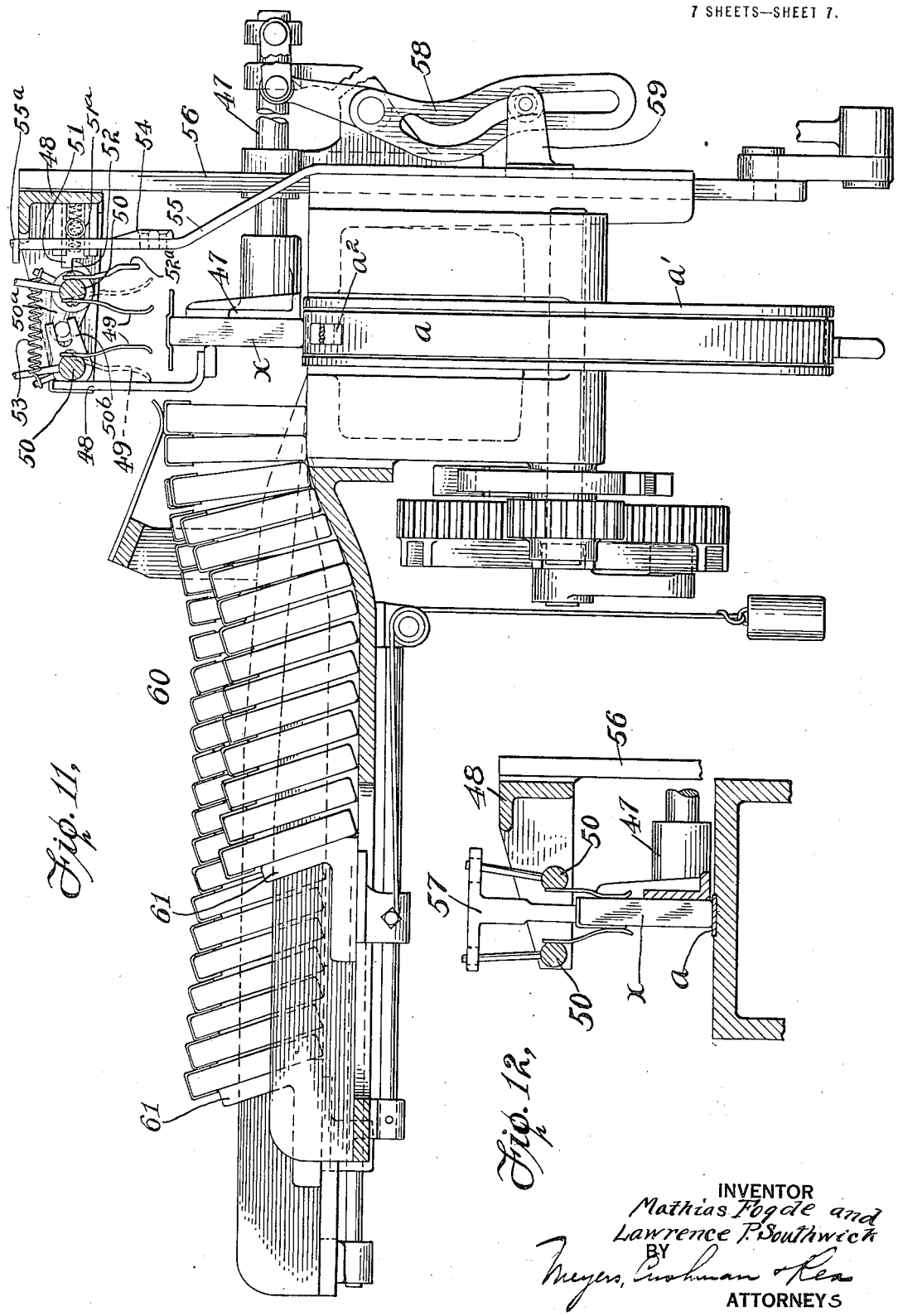

Patented Nov. 14, 1922.

1,435,459

UNITED STATES PATENT OFFICE.

MATHIAS FOGDE AND LAWRENCE P. SOUTHWICK, OF RICHMOND, VIRGINIA, ASSIGNORS, BY MESNE ASSIGNMENTS, TO STOKES & SMITH COMPANY, OF PHILADELPHIA, PENNSYLVANIA, A CORPORATION OF PENNSYLVANIA.

APPARATUS FOR PREPARING AND APPLYING STAMPS OR LABELS.

Application filed May 23, 1919. Serial No. 299,285.

*To all whom it may concern:*

Be it known that we, MATHIAS FOGDE and LAWRENCE P. SOUTHWICK, respectively a subject of the Government of Russia and a citizen of the United States, residing at Richmond, in the county of Henrico and State of Virginia, have invented new and useful Improvements in Apparatus for Preparing and Applying Stamps or Labels, of which the following is a specification.

This invention relates to improvements in apparatus for preparing and applying stamps or labels to commodity containing units, pertaining more particularly to apparatus designed to operate concurrently on a plurality of stamps or labels and units.

While the apparatus is designed for general use and is therefore not limited to use in special lines, it is particularly adapted to produce the stamping operation on containers of tobacco products—cigarette packages, for instance—being more particularly an improvement on the apparatus disclosed in patent granted to us October 23, 1917, No. 1,244,438.

The apparatus is designed to utilize stamp strips having a definite number of stamps connected together and apply them individually and concurrently to a corresponding number of units, the apparatus being operative to pick up a stamp strip in a stamp supply station, advance the picked up strip to a stamp attaching station—separating the strip into its individual stamp form and applying an adhesive coating to the individual stamps, these operations taking place during the travel of the stamp transfer mechanism from the supply station to the attaching station; while the stamps are thus being prepared for attachment to the units, the apparatus is also designed to produce a charge containing a corresponding number of commodity containing units with the units positioned on an intermittently movable support with the units standing on end and arranged in alignment with the front and rear faces substantially exposed—adjacent units having opposite side edge portions in juxtaposed relation—the charge being formed at a point in advance of the attaching station and moved into such station in position to receive the prepared stamps which are being advanced. The stamp transfer mechanism operates on the principles disclosed in the prior patent referred to, in providing for spreading of the stamp carriers after the stamps have been prepared and as the carriers approach the attaching stations, thus compensating for the difference in width of the stamp as compared with the unit, and making possible the application of each stamp at a proper point on an end of the unit.

The operation in the attaching station is designed to attach that portion of the stamp which overlies and is secured at the end of the unit, the end or ends of the stamp—depending upon whether the stamp is to be applied in a manner to extend onto both the front and rear faces of the unit or only onto one or the other of said faces; this attaching of this portion of the stamp is completed in the attaching station, the stamp carriers being so formed as to automatically produce this result during the operation of presenting the prepared stamp to its unit.

The charge formed of the assembly of units is then advanced from the attaching station to a succeeding station which may be considered as an end-applying station, this advance permitting a succeeding charge to be positioned in the attaching station ready for the advance of the next lot of stamps. Since the stamp attaching operation does not include any material movement of the stamp end or ends toward the faces to which they are to be applied, the charge advances with the end or ends projecting outwardly, so that when the end-applying station is reached, the end or ends of a unit are brought beneath a vertically movable instrumentality which is operative to turn down the end or ends of a stamp and make application thereof to the face or faces of the unit, the instrumentality being so arranged as to carry the applying member or members out of contact with the applied stamp during the return movement, thus preventing disarrangement of the applied stamp.

As each charge is in the form of a single row of units—ten, for instance—and the length of the row is such as to prevent efficient handling or packaging in such formation, the apparatus may be and preferably is designed to automatically provide a group division of the row as the row is shifted from the support on which it was positioned during these operations. A simple grouping is to divide the row into two groups of equal number, each group row being carried into a chute formation which retains the general character of the row formation but which locates the row of one group relative to that of another group as to either permit ready packaging manually through concurrent introduction of all of the units of a row into the carton or locate the group row or rows in such position as to permit a carton to be placed into position at the delivery end of the chute and permit the manual removal of the desired number of units from the chute formation with the units within the carton.

Some of the instrumentalities and mechanisms are more specifically described and claimed in companion applications, and are therefore not described in detail herein, the features referred to being pointed out in the detailed description.

The present invention therefore has for its objects the production of an apparatus operating along these general lines, and of particular instrumentalities operative to insure the proper application of the stamps under maximum capacity conditions and in such way as to practically prevent the undesired tacking of one unit to another such as may result from bringing one unit into contact with that portion of another which carries the stamp and which might present exposed adhesive capable of tacking the two units together.

Other objects are to provide an apparatus carrying safety factors and which is simple and efficient in operation, durable in construction, and which can be manufactured at a comparatively small cost when considered on a capacity basis.

To these and other ends, therefore, the nature of which will be readily understood as the invention is hereinafter disclosed, said invention consists in the improved construction and arrangement of parts hereinafter fully described, illustrated in the accompanying drawings, and more particularly pointed out in the appended claims.

In the accompanying drawings, in which similar reference characters indicate similar parts in each of the views, Figure 1 is a front elevation of an apparatus constructed in accordance with the general principles of the present invention.

Figure 2 is a top plan view of the same, parts being shown in section.

Figure 3 is a sectional view taken on the line 3—3 of Figure 2, the view illustrating various positions of the stamp transfer mechanism.

Figure 4 is a sectional view taken on the line 4—4 of Figure 2.

Figure 5 is a detailed sectional view of a portion of the transfer mechanism.

Figure 6 is a detailed sectional view showing a control mechanism operative in connection with the transfer mechanism.

Figure 7 is a top plan view of the stamp preparing mechanism.

Figure 8 is a detailed view of a portion of the transfer mechanism and showing more particularly one of the stamp carriers.

Figure 9 is a sectional view taken on the line 9—9 of Figure 8.

Figure 10 is a diagrammatic elevation showing the means for controlling the pneumatic line.

Figure 11 is an enlarged sectional view taken on the line 11—11 of Figure 2.

Figure 12 is a fragmentary detailed sectional view showing the modification.

Figure 13 is a perspective view showing the coated face of one of the stamps.

Since various features of the present invention are contained in the disclosure of prior patent referred to, while other features are contained in our prior application filed November 27, 1918, Serial No. 264,335, and in applications filed concurrently herewith, the present description is given in detailed form only in connection with portions claimed herein, a sufficient description of other portions of the general mechanism being included to permit of a clear understanding of the present invention.

The general apparatus disclosed herein embodies a number of instrumentalities mounted on suitable frame structures and arranged generally in the manner indicated in Fig. 2, the various instrumentalities being generally positioned with respect to the path of movement of a unit support indicated as in the form of an endless belt $a$ mounted on pulleys $a'$ and driven in suitable manner from a drive shaft $b$ in a manner to provide for intermittent advance movement of the upper flight of the band, the direction of advance movement of this flight being toward the left in Fig. 1.

Belt or band $a$ carries a plurality of outwardly extending projections $a^2$, these projections being spaced apart a distance substantially equal to the length of a charge of units, although, it will be understood that this distance may be varied so long as a sufficient distance is permitted between adjacent projections to receive the charge. And in the advancing movement of belt or band $a$—considered herein as the charge support—it will be understood that each advance brings one of the projections to a proper position with respect to the rear end of the charge, thus placing the charge directly in front of a projection, so that the succeeding advance of the support will positively advance the charge positioned thereon. The relative location of the instrumentalities is such that in advancing a charge from one station where an operation is performed to the succeeding station, it will locate the predetermined projections at the proper point to receive the charge, the projections being arranged to provide this result.

Since work is to be performed by each of the stations, the travel of the support is made intermittent, a dwell being provided in the travel, and this period of dwell is utilized at each of the stations to provide operation on a charge at such station. Hence, by the use of suitable connecting mechanism between one of the pulleys $a'$ and drive shaft $b$, proper timing action can be provided, Fig. 1 indicating one form of such mechanism, the particular type of connection shown being one of many forms of the " Geneva stop " motion, indicated generally at $c$.

For purposes of description, the travel of this upper flight may be considered as of three stages, referred to as stations and indicated respectively as the charge receiving station A, the stamp attaching station B and the stamp end applying station C. The charge of units is delivered to the support at station A, the charge advanced to station B and in which that portion of the stamp which is attached to an end of a unit is attached with a stamp end or ends projecting laterally (as shown for instance in Fig. 8), after which the charge is advanced to station C where the stamp end or ends are applied to the adjacent faces of the units, the charge itself then being shifted transverse to the direction of travel of the support onto a table or chute structure, thus carrying the charge off of the support.

While we have shown a number of the details of the charge forming and positioning instrumentality herein, no detailed description is given, this particular instrumentality forming the subject matter of the concurrently filed application Serial No. 299,286 now Patent 1,401,687. A brief general description is however given.

The charge is formed from the lower row of the contents of a reservoir 20 (Fig. 4), this reservoir being of dimensions sufficient to permit of the location side by side of the number of units which comprise the charge— ten, for instance, in the particular embodiment of the invention disclosed—these units forming a row in which adjacent units oppose each other on their side edges, the ends of the unit extending in a front to rear direction of the reservoir or receptacle. The receptacle 20 is adapted to receive a plurality of such rows and is of a form to permit replenishment at will. The lower row is advanced by the advancing movement of a slide member 21 which is mounted to reciprocate on a support in a front to rear direction, slide 21 being adapted to advance only the lower row of bulk supply, the advance of the slide shifting this row with one end foremost, the length of reciprocation of the slide being such as to carry the advancing row over the front edge of unit support 22 and over a trough-like portion 23, this portion having its walls spaced apart with one of the walls inclined outwardly to increase the width of the trough at its top, the result being that when the row of units is advanced a sufficient distance a point will be reached where the center of gravity of each unit passes outside of support 22, whereupon the units of the row will fall forwardly into this widened space at the upper portion of the trough and contact with the opposite wall, being temporarily arrested in a canted position, whereupon the slide in continuing its advance, will change the position from a canted position to one of substantially vertical plane, thus permitting the units to gravitate downwardly onto the belt or band $a$ which forms the bottom of the trough, this general arrangement being such that the general relation between units of the row first produced in the receptacle 20, will be maintained during the positioning action provided by slide 21, the only change produced being that while the units are supported with one of the flat faces contacting with the part which supports it while within the receptacle 20, the support is changed by bringing an end of the unit in contact with the herein referred to support $a$, thus locating the opposite end of the row of units as the upper portion of the charge and leaving the front and rear faces of the unit substantially exposed excepting as the walls of the trough may affect this condition.

The mechanism for providing the movement of slide 21 may be of any desired type, it being possible to utilize a continuously rotating member 24 driven from drive shaft $b$ and adapted to operate a crank $24^a$ which carries an element movable in a slot $25^a$ of a part 25 carried by the slide.

This charge forming and positioning instrumentality thus places the charge in position on the traveling support $a$, which latter is then advanced a distance sufficient to place this charge in the stamp attaching station B, it being understood, of course, that on the completion of this advance, a succeeding charge is placed in position on the succeeding portion of the travelling support. As heretofore pointed out, the stamps are attached to the upper end faces of the units of the charge while in this station B, and the various instrumentalities employed in preparing, delivering and attaching the stamp at this station will now be described.

The general arrangement of the instrumentalities for locating the stamps in station B are along the lines of those disclosed in the patent referred to, in that the stamps for the charge are placed in the machine in strip form, viz: all of the ten stamps are connected together along the side edges of the stamps, these stamps being located in a stamp strip receptacle 26 adapted to expose the top strip with the printed portion of the stamp uppermost; we prefer to employ a suitable control or compensating mechanism which will tend to maintain the successive top stamps in substantially the same plane, this being shown by the use of a false bottom to the receptacle, the weight of the stamps and bottom being counterbalanced by a suitable weight or other structure which may permit yielding of the stamp supply during the stamp delivery as presently described, thus providing for a proper compensating effect.

The stamp strip is transferred from the stamp supply to station B by a suitable transfer instrumentality made up of a part which reciprocates forwardly and rearwardly in a horizontal plane, and a plurality of stamp carriers supported on and movable in this reciprocating member, this general structure being along the lines of that disclosed in the patent, the carriers being supported on this travelling frame in such manner as to permit vertical movements therein as well as lateral movements as in the patent disclosure. However, certain changes have been provided and a more detailed description of this general structure is given.

The traveling frame of the transfer mechanism is shown generally at 27, being mounted in guides carried by the main frame and being reciprocated in a front to rear direction from a cam 28 on drive shaft $b$ through a suitable rock arm 29 connected by a link to the rear of the travelling frame, cam 28 being arranged to provide a throw sufficient to move the frame a distance equal to that required to shift the stamp carriers from the stamp supply station into the attachment station, the complete cycle of the travelling frame being arranged to provide a dwell at the opposite extremes of the frame movement. Frame 27 has its movements entirely in a horizontal plane.

Frame 27 is formed to support a plurality of stamp carriers, these corresponding to the number of stamps in the stamp strip—shown as ten in the present case. Each carrier, indicated generally at 30, is shown as in the form of a head $30^a$ slidably mounted on a pair of pins $30^b$ depending from a member $30^c$ supported on a guide $27^a$ carried by the frame, the relative arrangement of parts $27^a$ and $30^c$ being such as to permit members $30^c$ to shift laterally of the direction of travel of frame 27 while maintaining part $30^c$ from rotative action; as a result pins $30^b$, while shiftable laterally with member $30^c$, are not shifted relative to each other, the result being that head $30^a$ always maintains its front to rear position and thus prevents the stamp from being moved out of the position it should occupy in the applying station.

Head $30^a$ is supported by a tube 31, this tube extending through a slot formed in member $27^a$ and having its lower end secured to head $30^a$, tube 31 being connected up to a header 32 through suitable connections such as flexible connections $31^a$, header 32 being thus connected to the tubes 31 of each of the carriers. Header 32 is carried by a suitable bracket on frame 27 and is movable therewith, said header being connected up to a suitable means (not shown) for providing a suction action within the header, the present embodiment being designed to provide for intermittent connection of the header with the supply as presently described. Tube 31 carries a collar $31^b$, between which and a member 33 is located a spring 34, tube 31 being slidable within member 33, the latter resting upon member $30^c$, the spring providing a yieldable means for supporting head $30^a$ in its upper position.

Each tube 31 extends through a guide slot $35^a$ formed in a stationary horizontally extending guide plate 35, and member 33 is located within and guided by the walls of the corresponding slot $35^a$. As shown in Fig. 2, guide slots $35^a$ vary from a straight line, and hence as frame 27 advances, members 33 will act as guides to shift $30^c$ laterally as the direction of length of the slot varies from a straight line, this action causing the carrier to shift bodily as it may be guided by its guiding slot $35^a$ through the movements of member 33.

Guide plate 35 is of a type similar to that patented, the rear ends of the slots $35^a$ being arranged to locate each carrier above the portion of the strip which contains the particular stamp which the carrier is to advance, the slots being so arranged as to permit the carriers to advance a substantial distance toward station B while preserving the juxtaposed relation between adjacent carriers—the stamps being prepared while passing through this particular zone of the slots, as presently described—the slots then diverging so as to gradually shift the carriers laterally to points where each carrier will be located above the approximate central portion of the end of its unit in station B, the distances between adjacent carriers thus being increased to compensate for the difference in width between the width of the stamp and the width of the unit. After the stamp has been released from the head, the frame returns to its initial position, the slots returning the carriers to their closed relations.

The head $30^a$ as shown best in Figs. 8 and 9, has at its extremities spaced picker legs terminating in suction ports and carrying in the recess between the legs presser plate 36 adapted to slide vertically between the opposite walls of the recess formed by the picker legs, being prevented from rotating about the vertical axis thereby but being free to rotate about either a longitudinal or transverse horizontal axis, said plate being normally held within the recess by vertical guide flanges at the side limits of the walls thereof and is positioned by guide flanges at the lower extremities of side walls against which a spring $36^a$ bearing against top of the recess and the top of the presser plate holds the presser plate. The presser plate is shaped to project downwardly between the bottom flanges into a plane approximately the same as that of the lower faces of the picker legs.

This construction positively supports the stamp between the picker legs and presses it into positive contact with the article to which it is applied being freely movable to adapt itself to the surface of the article but positively held in position in the head.

As shown in Figs. 8 and 9, the U-shape portion of head $30^a$ is hollow and in open connection with tube 31, the ends of the legs of this portion being provided with perforations which open onto the plane of face $30^d$, thus placing the hollow head as a part of the suction line and effective at this face of the carrier. The intermediate portion of the head on the plane of this face is not connected to the suction line, the intermediate portion of the stamp being supported at this point by member 36, the stamp being held to the carrier by the suction action through the ports at the ends of the legs.

As will be readily understood, springs 34 will tend to hold heads $30^a$ in the same plane regardless of the movement of frame 27. Since, however, it is desirable that the transferring plane of the stamp be different from the plane at which the top stamp of the supply is located or the plane at which the stamp is being attached to the unit, provision is made for shifting the carriers vertically at these times, this means being shown as in the form of a member 37 at the rear extreme of the frame movement, and member 38 at the front extreme limit of movement of the frame. Each of these frames is supported to move vertically through the action of a cam carried by the drive shaft and individual to each member, each of these members 37 and 38 having recessed portions normally located in the path of travel of collars $31^b$, the material between recesses forming fingers which enter into an annular groove of the collar. Hence, when frame 27 approaches either extreme of its movement, collars of the several carriers will be properly positioned relative to their respective recesses in member 37 or 38, thus placing the entire set of carriers under the control of the member which is thus engaged.

When, therefore, the carriers are thus placed under the control of a member, cam action on the member will depress the latter and thus shift each carrier downwardly—the head moving on pins $30^b$—placing the springs 34 under compression. When the work to be performed in the depressed position of the heads is completed, the depressed member will be raised through the action of its cam and thus raise the entire set of carrier heads to their normal position, whereupon travel of frame 27 is resumed, automatically disengaging collars $31^b$ from such controlling member, this position of the carrier heads being retained until collars $31^b$ pass into position to be controlled by the member at the opposite extreme, whereupon the downward movement of such member again shifts the carrier heads out of the travelling plane and permits the work to be performed in such depressed position to be completed.

Each cycle of a carrier head, therefore, includes a downward movement of the head at the stamp supply station, picking up the stamp strip by all of the heads under the control action of member 37, the return of the head to travelling plane, the advance in such plane to position under the control of member 38—the position in station B—the downward movement in such station, during which the stamp is attached to the end of the unit and the ends of the stamps released, the return of the head to the travelling plane, and the retreating or return movement of frame 27 to again place the carriers under the control of member 37.

As will be understood, the carriers are concerned with stamps only during the pick-up movement of the stamp strip, the advancing movement of frame 27 and the carrying of the stamp into contact with the unit while in station B; at other times no stamp is present, and hence there is no necessity for the presence of suction action on the carriers at such other times. Advantage is taken of this fact to temporarily cut off the suction line from header 32 at this time, this being provided by the use of a suitable valve 39 in the header, said valve being adapted to open and close the connections between the header and the suction source. In the particular form shown this valve is of the rotary type and made operative through the oscillations of a segment 40 engaging a pinion carried by the stem of the valve. Segment 40 carries arms on opposite sides of its pivot, one of said arms being in a vertical plane of an element $37^a$ carried by member 37, the other of such arms being in a vertical plane of an element $38^a$ carried by member 38, these elements moving vertically with the members by which they are carried, and hence when these arms are brought into position at the time control is placed on either member 37 or 38, the downward movement will rock segment 40 in one direction—depending on which member is made active—thus moving the valve to active or inactive position. In practice, the downward movement of element 37ª serves to open the valve and thus place the header and each of the carrier heads into open communication with the suction source, the operation being a gradual one so that the maximum suction is applied at the time the head is in contact with the top stamp strip; on the return movement of member 37, this position of the valve is not changed, since element 37ª simply recedes from the segment arm, leaving the latter in its set position. When member 38 becomes active at the opposite extreme element 38ª contacts with the opposite arm as member 38 moves downward and rocks the segment in the opposite direction, thus gradually closing the valve to cut off the suction, the cut-off being completed as the downward movement continues, thus releasing the ends of the stamp from the suction action and permitting the heads to return to their travelling plane without tending to lift the stamp from its attached position.

If desired, valve 39 may be of the three-way type so arranged that when suction is cut off from header 32, said header will be connected directly to the outer air to release residual suction.

As heretofore pointed out, the stamps are prepared while they are being advanced from the stamp supply station to station B, and this action is provided by a general preparing instrumentality which is more particularly described and claimed in our companion application filed concurrently herewith, Serial No. 299284. A detailed description of the parts of this instrumentality is therefore thought unnecessary, a general description being given.

The initial preparing operation is that of dividing the stamp strip into its individual stamps without, however, affecting the position of the stamps on the carrier heads. This result is obtained by passing the supported stamp strip through the zone of activity of a rotating slitter indicated generally at 41 and which may be of suitable configuration, the form shown having a proper number of circular knives or saws properly spaced to operate on the portions of the stamp strip between adjacent carrier heads when the latter are in the vertical plane of the slitters. This slitting action divides the strip into its parts with each carrier head provided with its individual stamp, the latter having the direction of length from front to rear, and held from shifting in a rotating direction by the means heretofore described for preventing such movement of the head itself, so that while the heads are subsequently spread apart, the stamp is advanced individually with its direction of length transverse to the direction of travel of the unit support a.

After the stamp slitting operation has been completed—and in close succession thereto in the particular embodiment shown—each stamp has its exposed face provided with a suitable coat of adhesive, this coat being applied while the carriers are still advancing in their straight parallel portions of slots 35ª. The adhesive application is provided by the use of a rotatable segment 42 this segment being supported on a shaft in such manner as to cause the path of travel of its face to pass that of the path of travel of the advancing stamps, the two elements having their paths of travel in a tangential relation. The segment is driven by suitable connections from the drive shaft and these connections are preferably arranged in such manner as to cause the segment to have more than a single revolution during a cycle of the carriers, thus permitting a timing relation to be produced such as would prevent interference between the segment face and the heads 30ᶜ during the return travel of the carriers and at the same time provide for proper speed of travel of the face during the time of application of adhesive to the stamp. In addition, this use of a plurality of revolutions of the segment permits of the provision of a safety structure to meet abnormal conditions in the location of stamps on the carriers, and at the same time enables accurate registration of the adhesive applying face and the passing stamps, an advantage of moment in the general operations, for reasons presently referred to.

This safety structure is illustrated more particularly in Figs. 5, 6 and 7, in providing a disengageable connection between the shaft of the segment and its drive connections, the particular form being that of a pawl and notch structure, the notch being carried by a constantly rotating part of the drive connections, the pawl being movable with the segment shaft. While the pawl and notch connection is maintained, the segment will be continuously rotated; if, however, the pawl be rocked to disengage from the notch, the drive is broken and is again restored only when the notch has again reached the point where the pawl became disengaged from it.

The pawl and notch are normally engaged, and control of the breaking of the engagement is placed on an element carried by frame 27, this element being in the form of a pivoted lever 43 having an arm normally travelling in a path coincident with the vertical plane of the path of travel of the pawl, the latter being indicated at 44.

Should the pawl be in position in the normal path of travel of the lever arm when the latter is passing, said arm will act to rock the pawl and release the engagement, thus discontinuing the drive to the segment shaft, the segment remaining in its position: the parts are so arranged that under these conditions, the segment will be at a point removed from its zone of activity with the passing stamp; the advance of the frame 27 carries the arm out of contact with the pawl, the latter then passing the position where it will again enter the notch when the rotating element has completed its revolution, thus again connecting up the segment with its drive and causing the segment to resume its normal travel. Obviously, the advance of frame 27 is also carried by the stamp carriers beyond the zone of activity of the segment, so that the normal relationship between the travel of the stamp transfer means and the adhesive applying instrumentality is disturbed only by dropping one revolution of the plurality of revolutions of the segment which take place during a cycle of the transfer instrumentality operation, the revolution dropped being that which would carry the segment through the zone of activity at the time the carrier heads are with such zone.

However, lever 43 is movable to carry its arm out of this normal plane, and in such case, the pawl will not be disengaged from its notch. Shifting of the lever 43 to render its arm inactive is controlled by the conditions of the suction line, this being obtained by the use of a chamber 46 having a diaphragm 45 as one of its walls, said chamber being in open communication with header 32. Diaphragm 45 is connected to lever 43, and said lever is normally held in its active position by a spring, thus maintaining the diaphragm 45 in an outward position.

When, therefore, a proper location of stamps on the carrier heads entirely closes the perforations in such heads, the effect of the suction line will be placed on chamber 46 with the result that the position of diaphragm 45 will be changed and thus rock lever 43 to its inactive position. Should, however, the conditions at one or more of the carrier heads be such as to permit air to enter through uncovered perforations on such heads, the supply of air therethrough will be sufficient to prevent any material effect being had in chamber 46, the result being that diaphragm 45 will retain its normal position and the lever arm will remain active to break the drive connections to the segment.

The segment 42 has a length sufficient to apply adhesive to each of the stamps so carried by the carrier, and to meet an objection which is present in connection with the applying of stamps to units, the face of the segment is arranged to provide a coating in such form as to have the following general characteristics:

In the embodiment shown, the active portion of the segment is divided into a plurality of active faces each of which is individual to a single stamp, this being provided by the use of a plurality of grooves which extend transverse to the direction of length of the segment and divide the length into the proper number of active faces. These grooves are so spaced and are of such individual width, as to provide an over-all width of each active face less than the width of the stamp; these grooves are positioned in alignment with the division lines of the stamp strip, the result being that an uncoated marginal edge is provided at each of the side edges of the stamp. In addition, the angular length of each active face is less than the length of a stamp, so that with the proper timing relation between the travel of the carriers and that of the segment, uncoated marginal portions will be left at each end of the stamp, thus providing an uncoated marginal portion which extends throughout the periphery of each stamp.

The advantage of this particular formation lies in the fact that oozing of adhesive under the applying action is practically prevented, since any spreading which may take place can pass into these uncoated marginal portions and thus practically eliminate the possibility of having exposed adhesive after the stamp has been applied. It will be understood, of course, that this eliminates one difficulty which is present in general practice where two units which are brought into facial contact after stamps are affixed thereto, as when the units are stacked in rows or layers, tend to adhere to each other because of the exposed adhesive. This difficulty is eliminated by preventing the presence of such exposed adhesive, which also permits a general reduction in time required to complete the operations, since it is unnecessary to employ a time factor within which such exposed adhesive might dry before the face which carries its contacts with another face.

This action is increased by providing each active face of the segment with additional grooves extending parallel to the defining grooves, these additional grooves leaving uncoated portions into which the adhesive may spread, the total result being that the application of the adhesive is practically in stripe form.

Obviously, the timing relation in the movements of the carriers and of the segment is of great importance in attempting to produce the registration of a segment face and the stamp in order that the uncoated marginal ends of the stamp may be provided. While this result must be based on more or less accurate workmanship in the production of general connections where the adhesive applying member has a constant cycle of operation, the problems are very materially complicated where an attempt is made to prevent the possibility of coating a carrier face under the abnormal conditions, since this involves an attempt to prevent the carrier and the segment passing through the segment zone of activity at the same time as during the ordinary cycle. In this respect, the general arrangement employed and herein disclosed and disclosed in the companion application is of importance, in that no change is required in the drive connections whether the cycle of operation of the segment remains constant or is affected to meet abnormal conditions, the particular structure operating to simply drop one revolution of the segment carrying shaft while the remaining apparatus continues its normal operation, the shaft again resuming its regular operation in the cycle of the connections as soon as this revolution has been completed.

When the transfer instrumentality has advanced the stamps to station B, member 38 becomes active to depress the carrier heads and thus carry the several stamps downward into contact with the tops of the units which are present in that station. The units are positioned so that such upper unit face contacts with that portion of the stamp that is in front of the yieldable member 36, as shown in Fig. 8, said member preferably having dimensions such as would enter into a depression at the end of the unit if such depression be present in the unit, the result being that as the carrier head descends, the stamp will be carried into contact with the end and member 36 will force the portion of the stamp into proper position with respect to the unit end. And as heretofore pointed out, this downward movement of the carrier head automatically closes the suction line, so that conditions are presented which permit the end or ends of the stamp to project outwardly and be freed from the head. This latter action is more or less ensured by the fact that the length of downward travel of the carrier head is such that the perforated face portions of the head will pass below the top plane of the unit, and since the intermediate portion of the stamp is practically clamped between member 36 and the end of the unit, it will be understood that there is presented a drawing action which tends to shift the positions of the ends of the stamp inwardly and thus uncover one or more of the perforations on the face; since the suction line is cut off at this time, it will be understood, that the venting of the hollow head in this manner practically releases the connection between the stamp ends and the head and permits the head to be raised without affecting the position of the stamp or producing a pulling action on the stamp which might tend to break the adhesive application provided by the pressure of member 36.

This action is common with each of the stamps and on each of the units of the charge in station B, so that when the gang of carrier heads is returned to its travelling plane, each unit of the charge will have a stamp attached to the end of the unit with the stamp end or ends projecting outwardly. At this stage, the support $a$ is again advanced, carrying the units of the charge into the station C where the stamp end or ends are applied to the adjacent faces of the unit.

The mechanism which is made operative in station C and which applies a stamp end is more particularly disclosed in our companion application filed November 27, 1918, Serial No. 264,335, now matured into Patent No. 1,364,741, and hence is not described in detail herein, a brief reference thereto being made, the structure being illustrated more particularly in Fig. 11.

In Fig. 11, the charge is indicated diagrammatically by the unit $x$, it being understood of course that this represents a side edge of one of the units, the units of the charge being arranged substantially in the plane of the unit shown. In the particular position of the parts shown in this figure, the row of units is shown as supported by a plunger 47 which practically positions the charge row in proper position relative to rows of yieldable fingers which produce the applying action, these fingers being indicated at 49 and shown as located above the top plane of the units. It will be understood, of course, that during the time when the charge is being advanced from station B to station C, plunger 47 is retracted from the position shown in Figure 11 in order to permit free movement of the charge to position in the station, after which the plunger is advanced into contact and serves to properly position the units relative to the fingers 49.

Fingers 49 are shown in two rows each row being adapted to operate on the same face of the units of the charge, the rows being carried by rock shafts 50, which shafts are connected together for oscillating movements in unison with the movements of one shaft angularly opposite that of the other, the purpose being to so shift the rows of fingers as to vary the space between the fingers, these fingers, in the position shown in full lines in Fig. 11, being in approximately the closest position—the position occupied by them in applying the stamp end or ends—the opposite position being shown in dotted lines in this figure.

Shafts 50 are mounted in a frame 48 adapted to be moved vertically, the downward movement of the frame serving to carry fingers 49 into contact with the attached stamps and fold the stamp end or ends downward and into contact with the adjacent faces of each unit, plunger 47 being cut away at the proper points to permit free downward movement of the fingers. As the fingers are yieldable, it will be understood, that the applying action is one of pressure and the fingers will tend to smooth out the end or ends of the stamp. When the lower extreme of movement of frame 48 is reached, certain mechanism is brought into operation to shift the positions of the fingers into the spread position shown in dotted lines in Fig. 11, the frame returning to its upper position with the fingers spread in this manner.

The specific mechanism for accomplishing this result which is disclosed best in Fig. 11 includes a spring 53 operatively connected to shafts 50 and tending to maintain said shafts in position with fingers 49 spread as indicated in dotted lines in Fig. 11. The shafts are maintained with the fingers in full line position against the action of said spring by suitable latch mechanism and connection between said shafts. In the form disclosed, this includes a latch 51 engaging a shoulder 52 on one shaft 50, the opposite shaft being also held in corresponding position by a suitable connection between shafts, such as lug 50$^a$ on one of said shafts slidably engaging a channel in lug 50$^b$ on the other shaft. The shafts and fingers are maintained in this position during the descent of frame 48 accomplished by suitable mechanism including a slide 56 which is restricted by a suitable connection with the drive shaft. After fingers 49 have completed the smoothing of the stamp, the continued descent of the frame 48 brings the projection 51$^a$ of the latch 51 into engagement with the releasing cam 54 mounted on a stationary arm 55, the continued descent of the frame retracting latch 51 as the projection 51$^a$, which may be in the form of a roller, rides down the face of cam 54. This releases shoulder 52, permitting spring 53 to rock shafts 50 and throw fingers 49 into the spread position indicated by dotted lines in Fig. 11, in which position they remain until the ascent of frame 48 brings a portion of shoulder 52 extending laterally of latch 51 into engagement with a fixed abutment 55$^a$, thus rocking the shafts inwardly until latch 51 snaps over shoulder 52, when fingers 49 are again in operative position and frame 48 is ready to descend to smooth the stamps.

It may be found desirable in some cases to utilize means for retaining the proper adhesive connection between the end of the unit and the portion of the stamp which contacts with it, in order to prevent the possibility of the wiping action of the fingers from disturbing this adhesive connection which may not have been completely set. A simple structure for producing this result is shown in Fig. 12 in the form of a weighted element 57 which is seated on pins carried by shafts 50, the element being slidable on the pins and when inoperative being supported on the shafts. When, during the downward movement of the frame 48, the lower end of member 57 passes into contact with the upper end of a unit, the continued downward movement of the shafts simply causes the pins to move downwardly through the openings in the member 57 thus producing a pressure on the attached portion of the stamp and tending to retain the adhesive connection at this point. This is especially useful where the unit is of the type carrying a depressed end into which the stamp passes; or it is adapted for use where the stamp or label extends only onto one face of the unit, as indicated in Fig. 12.

After frame 48 has moved upward to a point where the fingers clear the upper ends of the units, plunger 47 is advanced toward the left in Fig. 11, this operation being provided through a slotted lever 58 pivotally supported on the main frame and having a link connection with the stem of plunger 47. Lever 58 carries a slot into which extends a projection carried by an arm 59, said arm being carried by slide 56, so that the vertical movements of the arm rock lever 58 to produce the proper reciprocating movements of plunger 47.

Advancement of plunger 47 toward the left in Fig. 11 operates to shift the entire row of units off of support $a$ onto a chute formation which is adapted to separate the row into group rows of five units each, plunger 47 returning to permit of the advance of the succeeding charge.

The chute structure, one form of which is disclosed in the drawings, and which provides for accumulation of rows capable of removal by an operator, a row at a time, is indicated generally at 60, this being one form of structure which may be employed. The particular structure of this chute formation is not particularly described, since the general idea forms the subject matter of our companion application filed concurrently herewith, Serial No. 299,287 now Patent 1,402,223. It may be noted that the arrangement is such that each charge row, as it is pushed off of support $a$, passes on into this chute formation and each successive row thus discharged automatically acts to advance the preceding rows and thus produce an accumulation, the particular form of chute shown including a pair of yieldable follower blocks 61 which act to retain the advance rows in proper relative position for ready removal by rows.

One feature of the chute formation is the general configuration of the surface over which the unit rows pass which has the effect of producing a relation between group rows such as will permit of rapid removal of an individual row by the use of inexpert labor, since each row contains the desired number of units utilized in a row of the carton within which the units are placed for the formation of a package such as are utilized in the commercial trade.

As will be understood from the above description, the apparatus itself is so formed and its instrumentalities are so arranged as to be operative on a plurality of charges concurrently, and while the various operations are divided into stages so that each charge must pass through a series of stations and thus be operated upon during several revolutions of the drive shaft, the apparatus as a whole produces the effect—with respect to capacity—of producing a completed charge with each revolution of the drive shaft, thus enabling the apparatus to operate at a high capacity although the apparatus itself may be operating at a comparatively low speed. For instance, if the drive shaft is operating at forty revolutions per minute, the apparatus has a capacity of four hundred completed units per minute, and this capacity is made possible by the general arrangement and through relative timing of instrumentalities and of parts of instrumentalities in such manner as to avoid interference as well as prevent disarrangement of elements through attempting to operate particular elements at speeds beyond that permitted to maintain the proper conditions of stamp transfer, etc. At the same time, automatic safety factors are present which prevent gumming up, etc. of parts under abnormal conditions; in addition, the general arrangement is such as to practically insure, under these high capacity conditions, the proper application of the stamps to the units, so that there is little or no likelihood of loss produced by loss of stamps through such abnormal conditions, it being understood that each of the stamps has a monetary face value.

While we have herein referred more particularly to the use of stamps and their application to commodity containing units of the type of cigarette boxes or cartons, it will be understood that the apparatus is adapted for use in applying labels in place of stamps and in connection with units of other kinds, and the specific description employed herein is not to be considered as restrictive in any sense in these general connections.

While we have herein shown and described a preferred embodiment of the invention, it will be readily understood that changes and modifications therein may be found desirable or necessary to meet the various exigencies of use and we desire to be understood as reserving the right to make any and all such changes and modifications as may be found necessary or desirable in so far as the same may fall in the spirit and scope of the invention as expressed in the accompanying claims when broadly construed.

What we claim is:

1. In an apparatus for concurrently preparing and applying stamps or labels to a plurality of units constituting a charge, charge forming mechanism adapted to produce a charge having its units extending in a single row with the front and rear faces free from contact with adjacent units, charge transferring mechanism for supporting the charge in its charge row formation, stamp or label preparing and attaching mechanism, stamp or label end applying mechanism, discharge mechanism, and means for co-relating the operations of said mechanisms to produce the following cycle of operations: form and position the charge on the charge carrying mechanism and shift the latter to stamp and label attaching position, subject a stamp or label strip successively to severing and adhesive applying action to produce and prepare individual stamps or labels and locate the prepared stamps in said attaching station in predetermined positions above the unit ends, move the stamps or labels into contact with the respective units and apply a portion of each stamp to the end of its unit, shift the unit carrying mechanism from the attaching station into the applying station with the stamp or label ends unattached, attach the ends of the stamps or labels in the latter station, and deliver the charge bodily from the unit carrying mechanism upon completion of the applying operation.

2. In an apparatus for concurrently preparing and applying stamps or labels to a plurality of units constituting a charge, charge forming mechanism adapted to produce a charge having its units extending in a single row with the front and rear faces free from contact with adjacent units, charge transferring mechanism for supporting the charge in its charge row formation, stamp or label preparing and attaching mechanism, stamp or label end applying mechanism, discharge mechanism, and means for co-relating the operations of said mechanisms to produce the following cycle of operations: form and position the charge on the charge carrying mechanism and shift the latter to stamp and label attaching position, subject a stamp or label strip successively to severing and adhesive applying action to produce and prepare individual stamps or labels and locate the prepared stamps in said attaching station in predetermined positions above the unit ends, move the stamps or labels into contact with the respective units and apply a portion of each stamp to the end of its unit, shift the unit carrying mechanism from the attaching station into the applying station with the stamp or label ends unattached, attach the ends of the stamps or labels in the latter station, and deliver the charge bodily from the unit carrying mechanism upon completion of the applying operation, automatically segregating the charge row formation of units into group row formations by the delivery operation.

3. In an apparatus for preparing the stamps of a strip of stamps and applying the stamps to a charge of individual units concurrently, a stamp supply station, stamp transfer mechanism movable between said station and applying station and including a plurality of carriers each movable in predetermined paths in a single plane between said stations, means for shifting the carriers in vertical directions when in either station, pneumatic means operatively connected to each carrier to retain a stamp in position thereon during transfer, and control mechanism for rendering said pneumatic means active and inactive, said control mechanism being operative to render said pneumatic means inactive during movement of the carriers from the applying to the supply station.

4. In an apparatus for preparing the stamps of a strip of stamps and applying the stamps to a charge of individual units concurrently, a stamp supply station, stamp transfer mechanism movable between said station and applying station and including a plurality of carriers movable in predetermined paths in a single plane between said stations, means for shifting the carriers in vertical directions when in either station, pneumatic means operatively connected to each carrier to retain a stamp in position thereon during transfer, and control mechanism for rendering said pneumatic means active and inactive, said control mechanism including a suction line common to the several carriers, valve mechanism for controlling said line, and devices carried by the vertical shifting means and operative with said valve mechanism for opening and closing the valve.

5. In an apparatus for preparing the stamps of a strip of stamps and applying the stamps to a charge of individual units concurrently, a stamp supply station, stamp transfer mechanism movable between said station and applying station and including a plurality of carriers movable in predetermined paths in a single plane between said stations, means for shifting the carriers in vertical directions when in either station, pneumatic means operatively connected to each carrier to retain a stamp in position thereon during transfer, and control mechanism for rendering said pneumatic means active and inactive, said shifting means including an instrumentality for each station operative solely at its station, said control mechanism including a suction line having an element movable with the transfer mechanism and common to each of the carriers, said element having a valve mechanism for controlling the suction thereto and a device carried by the vertical shifting means and operative with said valve mechanism to move the latter between its open and closed position.

6. In an apparatus for preparing the stamps of a strip of stamps and applying the stamps to a charge of individual units concurrently, a stamp supply station, stamp transfer mechanism movable between said station and applying station and including a plurality of carriers movable in predetermined paths in a single plane between said station, means for shifting the carriers in vertical directions when in either station, pneumatic means operatively connected to each carrier to retain a stamp in position thereon during transfer, and control mechanism for rendering said pneumatic means active and inactive, said shifting means including an instrumentality for each station operative solely at its station, said control mechanism including a suction line having an element movable with the transfer mechanism and common to each of the carriers, said element having a valve mechanism for controlling the suction thereto and a device carried by the vertical shifting means and operative with said valve mechanism to move the latter between its open and closed position, said device being operative to open the valve when the carriers are in the supply station and close the valve when in the applying station to render the pneumatic means inactive during the movement of the carriers from the applying station to the supply station.

7. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, and means operative solely during the period of pneumatic means activity on the carrier for rendering said adhesive applying mechanism inactive on the passing carrier in the absence of a stamp on said carrier during such passing period.

8. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, and means for rendering said adhesive applying mechanism inactive on the passing carrier in the absence of a stamp on said carrier and during such passing period, said latter means being normally active potentially and rendered inactive in the presence of a properly positioned stamp.

9. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, and means for rendering said adhesive applying mechanism inactive on the passing carrier in the absence of a stamp on said carrier and during such passing period, said latter means being normally active potentially and being operatively connected to the pneumatic means and variable from its normal condition solely during the period of activity of the pneumatic means and in the presence of a properly positioned stamp.

10. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, said means including a segment rotatable in a circular path and movable through its zone of activity more than a single time during a single cycle of carrier movement, and means for rendering said segment inactive on the passing carrier in the absence of a stamp on said carrier during said passing period.

11. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, said means including a segment rotatable in a circular path and movable through its zone of activity more than a single time during a single cycle of carrier movement, and means for rendering said segment inactive on the passing carrier in the absence of a stamp on said carrier during said passing period by reducing the number of segment revolutions by one during said cycle.

12. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, said means including a segment rotatable in a circular path and movable through its zone of activity more than a single time during a single cycle of carrier movement, drive connections for said segment and including a constantly rotating element and an element engageable therewith to be driven thereby, said latter element being permanently operatively connected to the segment, and means for rendering said segment inactive on the passing carrier in the absence of a stamp on said carrier during such passing period by breaking the engagement of said elements during one rotation of the constantly rotating element.

13. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, said means including a segment rotatable in a circular path and movable through its zone of activity more than a single time during a single cycle of carrier movement, drive connections for said segment and including a constantly rotating element and an element engageable therewith to be driven thereby, said latter element being permanently operatively connected to the segment, and means for rendering said segment inactive on the passing carrier in the absence of a stamp on said carrier during such passing period by breaking the engagement of said elements during one rotation of the constantly rotating element, said latter means being normally active potentially to provide such disengagement and rendered inactive to effect disengagement in the presence of a properly positioned stamp on the carrier.

14. In an apparatus for preparing stamps for application to units, a stamp supply station, stamp transferring mechanism movable between said station and an applying station and including a carrier movable substantially in a single plane between said stations, controllable pneumatic means operative on said carrier for maintaining the position of a stamp on the carrier between said stations, said means being inoperative during travel of the carrier from the applying to the supply station, adhesive applying mechanism operative to apply adhesive to the stamp during stamp advancing movement, said means including a segment rotatable in a circular path and movable through its zone of activity more than a single time during a single cycle of carrier movement, drive connections for said segment and including a constantly rotating element and an element engageable therewith to be driven thereby, said latter element being permanently operatively connected to the segment, and means for rendering said segment inactive on the passing carrier in the absence of a stamp on said carrier during such passing period by breaking the engagement of said elements during one rotation of the constantly rotating element, said latter means being operatively connected to and subject to the operation of the pneumatic means and being normally active potentially to provide such disengagement and rendered inactive to effect disengagement by such pneumatic means in the presence of a properly positioned stamp on the carrier.

15. In an apparatus for applying a stamp to an end of a commodity containing unit and wherein at least one end of the stamp is applied to an adjacent wall of the unit, a shiftable support for the unit, means for securing that portion of the stamp which overlies the unit end in applied position to the upper face of the unit, mechanism operative on the unit with its positioned stamp for applying such end portion to the adjacent wall, and means for advancing the support to shift the unit from said securing means to the applying mechanism, said mechanism being normally positioned above the travel path of the unit and movable vertically through the plane of the top of the unit to apply the stamp end.

16. In an apparatus for applying a stamp to an end of a commodity containing unit and wherein at least one end of the stamp is applied to an adjacent wall of the unit, a shiftable support for the unit, means for securing that portion of the stamp which overlies the unit end in applied position to the upper face of the unit, mechanism operative on the unit with its positioned stamp for applying such end portion to the adjacent wall, and means for advancing the support to shift the unit from said securing means to the applying mechanism, said mechanism being normally positioned above the travel path of the unit and movable vertically through the plane of the top of the unit to apply the stamp end, said mechanism including a yieldable element adapted to move the stamp end to its applying position and secure it in such position during travel in one direction and shiftable out of contact with the applied stamp when returning to normal position.

17. In an apparatus for applying a stamp to an end of a commodity containing unit and wherein at least one end of the stamp is applied to an adjacent wall of the unit, a shiftable support for the unit, means for securing that portion of the stamp which overlies the unit end in applied position, mechanism operative on the unit with its positioned stamp for applying such end portion to the adjacent wall, and means for advancing the support to shift the unit from said securing means to the applying mechanism, said mechanism being normally positioned above the travel path of the unit and movable vertically through the plane of the top of the unit to apply the stamp end, said mechanism including a pair of guide arms, and means removably supported on said arms for maintaining the position of that portion of the stamp attached to the unit end while the stamp ends are undergoing application.

18. In an apparatus for applying a stamp to an end of a commodity containing unit and wherein at least one end of the stamp is applied to an adjacent wall of the unit, a shiftable support for the unit, means for securing that portion of the stamp which overlies the unit end in applied position, mechanism operative on the unit with its positioned stamp for applying such end portion to the adjacent wall, and means for advancing the support to shift the unit from said securing means to the applying mechanism, said mechanism being normally positioned above the travel path of the unit and movable vertically through the plane of the top of the unit to apply the stamp end, said mechanism including a pair of guide arms, and a weighted member removably supported relative to said arms for maintaining the position of that portion of the stamp which is attached to the unit end while the stamp ends are undergoing application.

19. In an apparatus for preparing stamps or labels and attaching them to commodity containing units, and wherein the preparing is provided during travel of the stamp or label from a stamp supply station to an attaching station, stamp or label transfer mechanism including a stamp or label carrier, said mechanism being operative to move said carrier substantially in a single plane between said stations, means for moving the carrier vertically relative to such plane in either station, and pneumatic means operative at spaced points on the face of the carrier to support the stamp at its ends, said carrier including a yieldable element intermediate said spaced points and adapted to form a support for the intermediate portion of the stamp during the stamp preparing operation.

20. In an apparatus for preparing stamps or labels and attaching them to commodity containing units, and wherein the preparing is provided during travel of the stamp or label from a stamp supply station to an attaching station, stamp or label transfer mechanism including a stamp or label carrier, said mechanism being operative to move said carrier substantially in a single plane between said stations, means for moving the carrier vertically relative to such plane in either station, and pneumatic means operative at spaced points on the face of the carrier to support the stamp at its ends, said carrier including a yieldable element intermediate said spaced points and adapted to provide pressure onto the intermediate portion of the stamp during the applying application.

21. In an apparatus for preparing stamps or labels and attaching them to commodity containing units, and wherein the preparing is provided during travel of the stamp or label from a stamp supply station to an attaching station, stamp or label transfer mechanism including a stamp or label carrier, said mechanism being operative to move said carrier substantially in a single plane between said stations, means for moving the carrier vertically relative to such plane in either station, and pneumatic means operative at spaced points on the face of the carrier to support the stamp at its ends, said carrier including a yieldable element intermediate said spaced points and adapted to form a support for the intermediate portion of the stamp during the stamp preparing operation and being operative to apply pressure to such stamp portion during the applying operation.

22. In an apparatus for transferring stamps or labels from a supply station to an applying station, a travelling carrier having a carrying face, a pneumatic means operative at opposite ends of such face, said carrier having an intermediate recess leading from the plane of said face, and an element supported in said recess and yieldable toward the bottom of the recess to provide a face contacting the intermediate portion of the stamp during stamp applying operation.

23. In an apparatus for transferring stamps or labels from a supply station to an applying station, a travelling carrier having a carrying face, a pneumatic means operative at opposite ends of such face, said carrier having an intermediate recess leading from the plane of said face, said recess having guides, and an element within said recess and yieldable therein, said guides being operative to maintain the element within the recess while permitting variable movements of the element within the recess.

24. In an apparatus for transferring stamps or labels from a supply station to an applying station, a travelling carrier having a carrying face, a pneumatic means operative at opposite ends of such face, said carrier having an intermediate recess leading from the plane of said face, said recess having guides, and a spring-supported element within and yieldable toward the bottom of said recess, said guides being operative to maintain the element within the recess while permitting variable movements of the element therein.

25. In a stamp applying machine, in combination, a conveyor adapted to receive a plurality of articles forming a charge, means for simultaneously attaching a stamp to each of the articles in the charge, means for completing the attachment of the stamps operative contemporaneously with the attaching means, means for actuating the conveyor to transport the charge from charging position to initial attaching position and then to final attaching position successively, and means for arranging a plurality of articles on the conveyor to form a charge operated contemporaneously with the attaching means and the attachment completing means.

26. In a stamp applying machine, means for applying stamps simultaneously to each of a plurality of articles forming a charge, means for thereafter smoothing the stamps into close contact with the articles operative contemporaneously with the applying means, a conveyor adapted to move said charge successively into operative relation to the applying means and the smoothing means, and thence into discharge position, and means operative contemporaneously with the applying and smoothing means for automatically removing the articles simultaneously from the conveyor in discharging position.

27. In a stamp applying machine, a stamp carrier movable between a stamp supply and an affixing station, suction means on said carrier for engaging a stamp, engaging means for actuating the carrier at the supply station to engage a stamp, affixing means for actuating the carrier at the affixing station to apply the stamp, and means for controlling the suction means operated by the engaging means to turn on the suction and by the affixing means to cut off the suction.

28. In a stamp applying machine, a stamp carrying device having spaced stamp engaging portions and a presser plate located adjacent the stamp between said engaging portions and receding upon pressure of an article to which a stamp is to be applied.

In testimony whereof we have hereunto set our hands.

MATHIAS FOGDE.
LAWRENCE P. SOUTHWICK.